April 30, 1940.  H. H. GARNER  2,198,963
AIR CLEANER
Filed March 31, 1937   3 Sheets-Sheet 1

INVENTOR
HERMAN H. GARNER
BY HARRIS, KIECH, FOSTER & HARRIS
PER
ATTORNEYS.

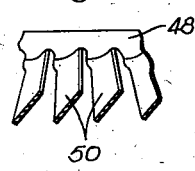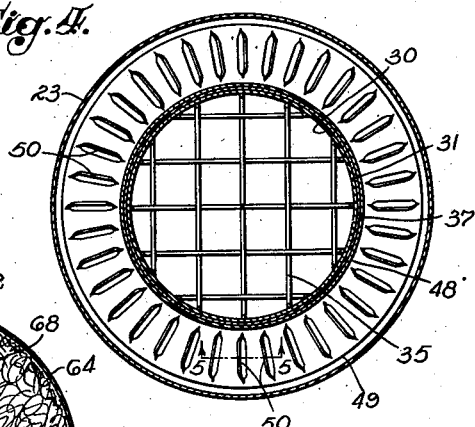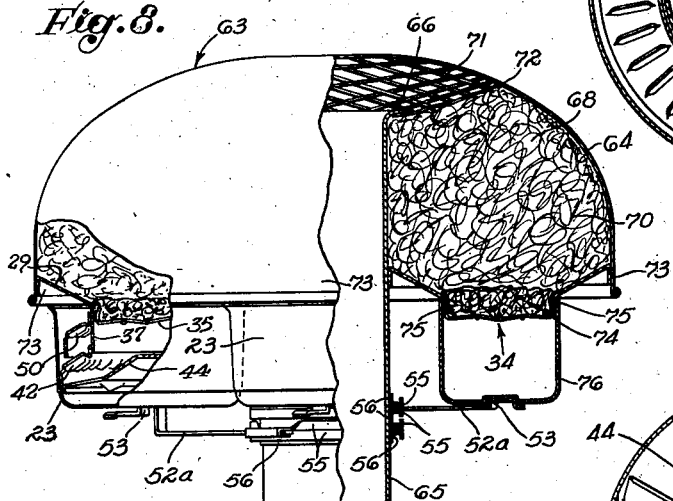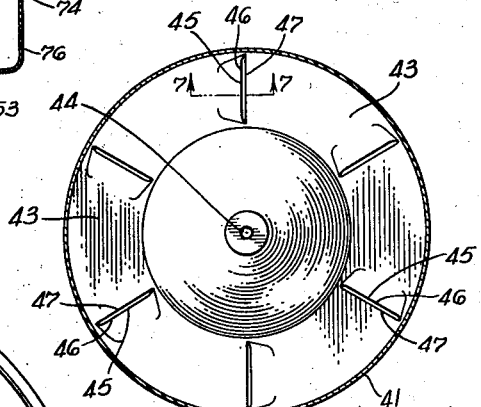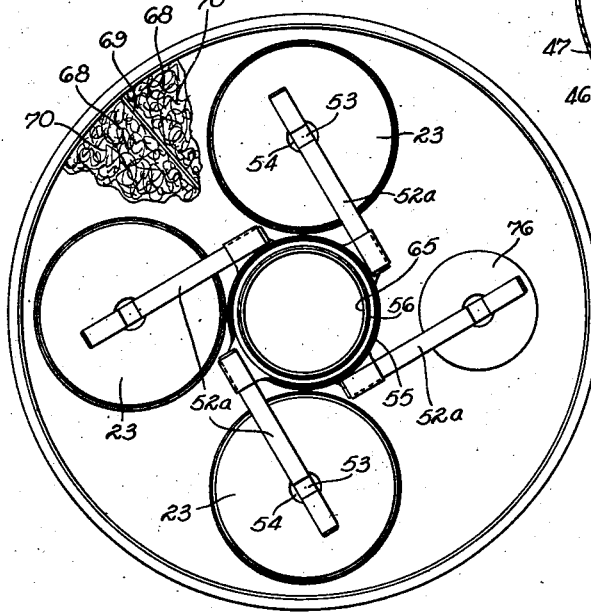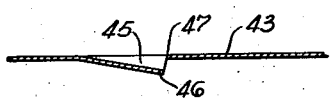

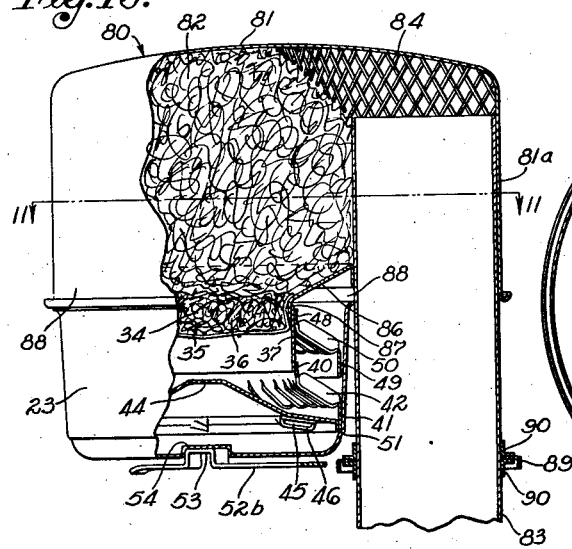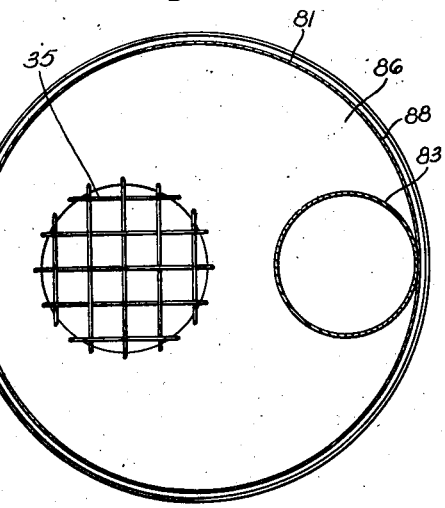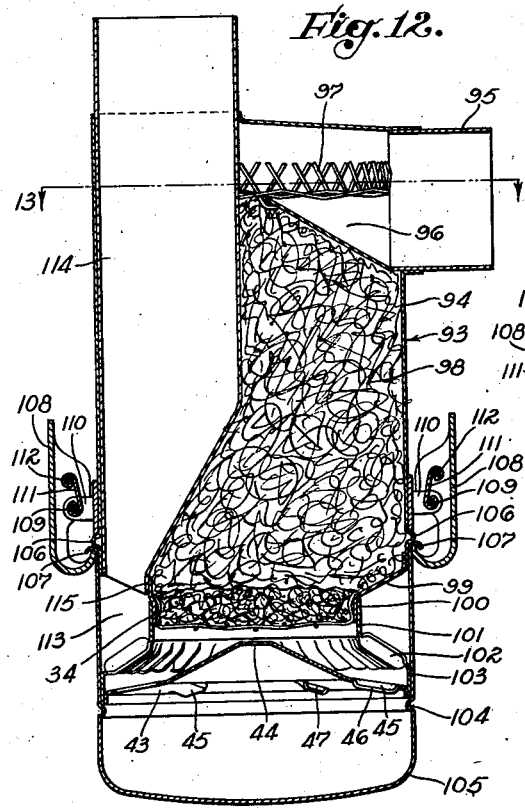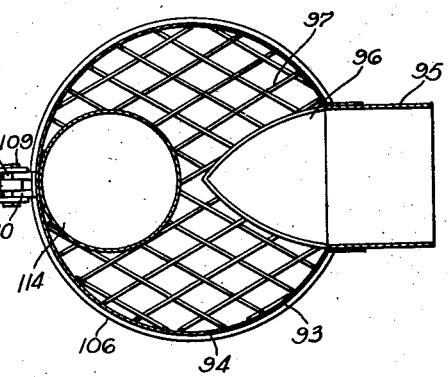

Patented Apr. 30, 1940

2,198,963

UNITED STATES PATENT OFFICE

2,198,963

AIR CLEANER

Herman H. Garner, Claremont, Calif., assignor, by mesne assignments, to Herman H. Garner and Bess A. Garner, both of Claremont, Calif.

Application March 31, 1937, Serial No. 133,956

9 Claims. (Cl. 183—15)

My invention relates to means for filtering dust-laden air, particularly devices for cleaning the air supplied to various mechanisms such as internal combustion engines.

In air cleaners of the type involved, a stream of air is drawn over a body of liquid and upward into a mass of filter material spaced above the liquid body. The air stream may be in the form of a vortex between the liquid and the filter. Some of the dust particles carried by the air are thrown directly into the oil body, some are caught on liquid-coated walls between the oil body and the filter, many are entrained by droplets or spray in the air stream and carried either to the walls or to the filter medium, and the remaining free particles of dust in the air stream are trapped in the liquid-impregnated filter itself. Droplets of liquid may be thrown against the walls mentioned, while other droplets are carried into the filter medium to return therefrom down the walls to the liquid body. Thus, the liquid, preferably an oil, not only serves to entrap dust in the liquid body itself and in the filter medium, but also serves continuously to wash the filter medium and the aforementioned walls. The continuous washing of the filter medium is important to prevent clogging of air passages therethrough.

One object of my invention is to provide a change in direction of the dust-laden air stream that will reinforce the gravitational tendency of dust to move downward toward the oil body.

Another object is to restrict the diameter of the vortex to increase the tendency of the vortex to throw dust particles against peripheral walls.

In the usual air cleaner the velocity of the air stream from the oil body to the filter medium varies with the rate of air consumption. Keeping the filter medium impregnated with oil at high rates of air consumption is, therefore, no problem, but at low rates of air consumption effective saturation of the filter medium is difficult to achieve and to maintain, especially over extended periods. If an engine equipped with an air cleaner is operated at near idling speed for a prolonged period, the filter medium may become so dry from lack of oil that it will fail to protect the engine intake from dust.

Having in mind the tendency of the filter medium to become dry at low rates of air consumption, I have, as one object, to provide a relatively high velocity of air flow in the vicinity of the oil body at relatively low rates of air consumption. More specifically, I contemplate providing an automatic valve means operating at low rates of air consumption to restrict the air stream where the air stream contacts the oil body, thereby locally increasing the velocity of the air stream to increase its effectiveness as means for entraining oil. In the preferred form of my invention, I have as an object to employ the oil body itself as the moving part of the valve means, thereby avoiding mechanism involving moving mechanical parts, as well as insuring intimate contact of the air stream with the oil.

Since oil can serve as a depository for dust only up to a limited concentration, it is desirable to provide a relatively large body of oil in the cleaner, thereby decreasing the frequency of servicing required. On the other hand, the permissible quantity of oil available for transmission into the filter medium is limited by the fact that oversaturation of the filter medium results in a loss of oil into the air stream passing from the filter. In view of these two considerations, some barrier means, such as a baffle-plate, may be employed to separate the oil body into an upper stratum freely movable into the air stream, and a lower protected stratum available for final deposit of dust. Such a plate may be conical in configuration with its apex extending upward into the center of the vortex. Oil on the upper surface of the plate will tend to be entrained by the air vortex, and oil not entrained in the peripheral regions of the plate will flow in spiral streams toward the center of the plate under the influence of the vortex.

One of the objects of my invention is to so relate such a plate with the walls between the oil body and the filter medium as to cause dust-laden oil gravitating down such walls to be received on the plate, and to provide suitably disposed apertures in the plate to divert spiral dust-laden streams of oil from the upper surface of the plate into the depository oil below the plate.

Another object is to provide positive means for deflecting the air stream against the plate in a manner to favor entrainment of oil and to encourage the spiral flow over the plate surface.

It is also an object of my invention to provide air-intake baffles effective to prevent discharge of the liquid from the air cleaner by backfiring of the engine with which the cleaner is used.

One important object of my invention is to provide a down-draft air cleaner that may be serviced without removing the cleaner as a whole.

Another object of my invention is to provide an air cleaner of adjustable capacity whereby the cleaner may be conveniently adjusted for optimum operating conditions with various rates of air flow. More particularly stated, my object is to provide a plurality of means for delivering oil-laden air to a filter body that may be selectively removed and replaced by closure means.

A further object in constructing the device with a plurality of replaceable units is to provide an air cleaner that may be serviced while in operation, the individual units being removed and replaced successively for such purpose.

A further object of my invention is to provide in association with the filter material a temporary storage space for oil that is adapted to drain back into the oil body when the air cleaner is idle or when the rate of air consumption drops to a minimum.

In some of the specific forms of my invention disclosed herein, one of my important objects is to minimize the vertical dimensions of the air cleaner to permit installation of a relatively high capacity air cleaner in the vertically limited space under the hood of an automobile or tractor.

In another specific form of my invention my object is to provide a down-draft air cleaner of exceptionally simple structure to draw air from substantially elevated regions.

The above and other objects of my invention will be apparent in my detailed description to follow, taken with the accompanying drawings.

In the drawings:

Fig. 4 is a section taken along the line 4—4 of Fig. 3.

Fig. 5 is a fragmentary section of Fig. 4 taken along the line 5—5 of Fig. 4.

Fig. 6 is a plan view of a conical disc employed in my device.

Fig. 7 is a fragmentary section taken as indicated by the line 7—7 of Fig. 6.

Fig. 8 is a side elevation partly in section of a second form of my invention.

Fig. 9 is a bottom plan view of Fig. 8 partly broken away.

Fig. 10 is a side elevation partly in section of a third form of my invention.

Fig. 11 is a horizontal section taken as indicated by the line 11—11 of Fig. 10, with the filter material removed to reveal the interior structure.

Fig. 12 is a vertical section of another form of my invention.

Fig. 13 is a horizontal section taken as indicated by the line 13—13 of Fig. 12.

Figure 1:
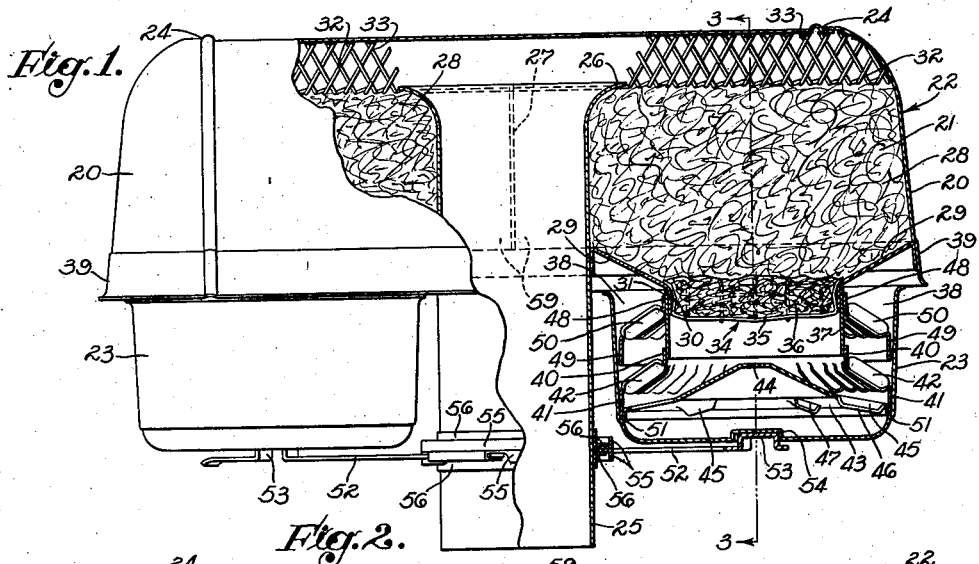
Fig. 1 is a side elevation partly in section showing one form of my invention.

Each of the various forms of my invention includes a casing of separable parts, comprising an upper casing for a filter unit and one or more lower casing units employed as oil cups removably connected to the filter unit. Thus, in Fig. 1, an upper casing 20 containing filter material 21 constitutes a filter unit generally designated by the numeral 22, and two oil cups 23 are shown associated with the underside of the filter unit.

The casing 20, which may be fabricated in sections, as indicated by seams 24, is supported by a central pipe 25 that is adapted to be mounted, for example, on the carburetor of an engine (not shown). This pipe 25 serves as a discharge passage for air from the filter unit 22, the pipe extending through the bottom of the filter unit and terminating in a flared end 26 in the interior of the filter unit near the top of the casing 20. Extending diametrically from the pipe 25 within the filter unit 22 are two diametrically opposite partitions 27 connected to opposite walls of the casing 20 to divide the filter unit into two filter compartments 28. These partitions prevent oil movement between the compartments 28 below the inlet level of the pipe 25.

Figure 3:
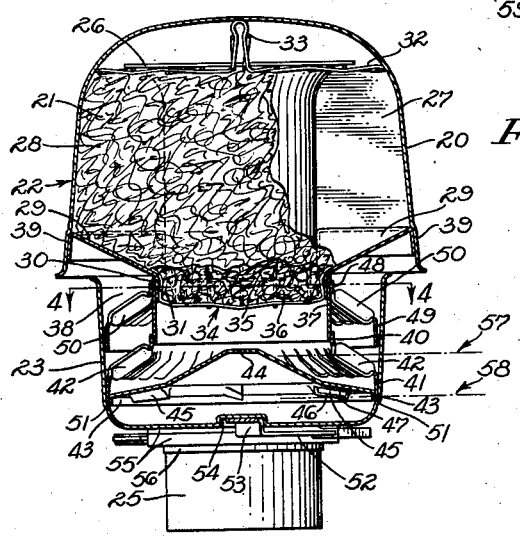
Fig. 3 is a transverse vertical section taken as indicated by the line 3—3 of Fig. 1.

Each of the two filter compartments 28 has a bottom 29 having the general configuration of an inverted pyramid or cone, the bottom terminating in an opening 30 defined by a depending annular flange 31. The filter material 21 in each compartment preferably consists of relatively fine crimped wire. At the top of the filter unit the filter material 21 is held in place by a suitable coarse-mesh screen 32 that surrounds the pipe 25 and extends horizontally across the interior of the casing. Spacer means engaging the interior of the casing at the top thereof to retain the screen 32 in its proper disposition may be provided by a longitudinal rib 33 formed by folds in the screen, as indicated in Fig. 3.

The opening 30 of each compartment may be spanned by any suitable screen-means that will serve to support the filter material 21; I prefer, however, to provide for this purpose a removable filter element of relatively coarse material. For example, in the drawings the numeral 34 generally designates a filter element comprising a cup-shaped screen 35 seated in the flange 31 in yielding engagement with the bottom 29 of the filter compartment 28, the cup-shaped screen containing a mass of relatively heavy crimped wire 36.

Slidingly embracing the annular flange 31 is a cylindrical shell 37 providing an air passage from the interior of the cup 23 to the interior of the filter unit 22 and defining with the cup 23 an annular intake passage 38 into the interior of the cup. It will be noted that the intake passage 38 is protected by the overhanging filter unit 22 and a skirt 39 provided by the casing 20.

Associated with each oil cup are means to create a vortex in the air stream between the cup and the filter unit, preferably a vortex of smaller diameter than the cup, and barrier-means to protect a portion of the oil in the cup from the forces of such vortex. These means may be conveniently carried by the cylinder 37. For example, I may form in one piece a deflector unit comprising an upper collar 40 secured to the lower edge of the cylinder 37, a circular band 41 of larger diameter than the collar, and a plurality of inclined radially disposed deflector blades 42 interconnecting the collar and band and spanning the intake passage 38. A disc 43, preferably conical in configuration, is secured at its periphery to the band 41 to serve as a barrier or baffle for protecting a lower level of oil in the cup 23. The disc 43 has an upper concentric opening 44 and a plurality of radially disposed apertures 45. Preferably these apertures are provided by radial slits having edges 46 turned down in a disposition to favor flow of liquid downward through the disc under the influence of the air vortex created by the deflector blades 42. The opposite edges 47 may be slightly turned up for the same purpose, if desired.

To prevent the discharge of oil from the annular intake passage 38 by reversal of air flow occasioned, for example, by an engine backfiring, I prefer to associate some type of baffle means with the intake passage 38. I have found that a second deflector unit will serve this purpose as well as cooperate with the first deflector unit in the creation of the desired vortex. This second unit secured to the cylinder 37 above the lower deflector unit may be identical in construction to the lower deflector unit, comprising an upper collar 48, a lower circular band 49, and radially disposed deflector blades 50 interconnecting the collar and the band.

Each of the two cups 23 may be removably secured in place in any suitable manner. In the construction indicated by the drawings, each cup 23 frictionally embraces the band 41, an inner shoulder 51 of the cup engaging the bottom edge of the band. Each cup is held in place by a yielding finger 52 having an offset 53 adapted to engage a recess 54 in the bottom of the cup. The two fingers extend tangentially from two rings 55 rotatively embracing the pipe 25, the two rings being held against axial movement by a pair of flanged collars 56 mounted on the pipe.

To prepare the air cleaner for operation, the oil cups are filled to approximately the level 57 indicated in Fig. 3 which may be conveniently referred to as the idle level of the oil body. It will be noted that the disc 43 is for the most part below this level, and it will be further noted that if the interval between the deflector blades be considered as constituting the lower end of the intake passage 38, the oil at the level 57 partially submerges the inner end of the passage in a manner to restrict locally the air flow through said passage especially when the device is operated at low rates of air consumption. It will be understood that the inner end of the intake passage may be completely submerged, if desired.

When air is drawn from the pipe 25 by an engine or other device, air passes through the intake passage 38 and is deflected in a rotary manner both by upper blades 50 and lower blades 42, the result being a vortex of air formed in the cup 23 and inside the cylinder 37. As the result of the rotation of the air stream, a low-pressure zone extends axially up the cylinder 37 in communication with the central opening 44 in the disc 43, and a peripheral high-pressure zone is built up inside of the cylinder 37 and in the vicinity of the openings 45 in the disc 43. Oil is entrained by the air, both by the vortex sweeping the upper surface of the disc 43 and by the air current passing downward through the apertures 45 and thence upward through the central opening 44 of the disc. As the result of such action on the part of the air stream, the oil in the cup tends to fall to an operative level 58, the difference in the two oil levels being accounted for by oil carried into the filter unit and by oil thrown against the inner surface of the cylinder 37.

Figure 2:
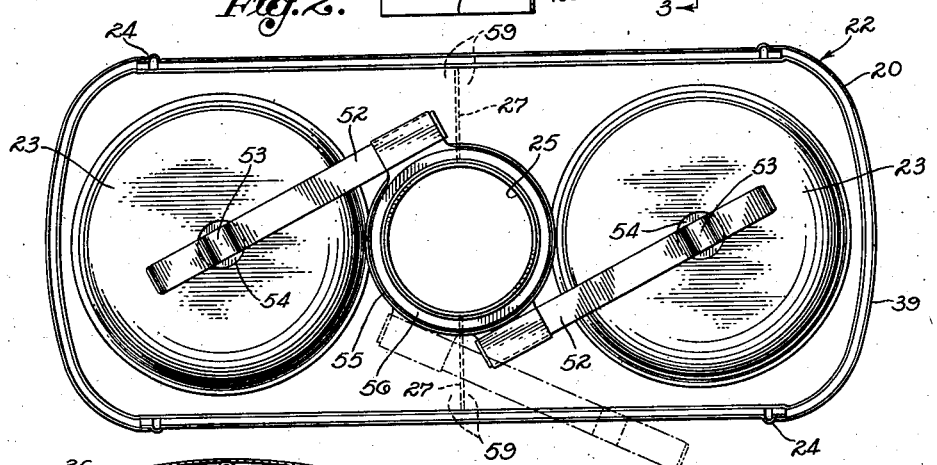
Fig. 2 is a bottom plan view of the device shown in Fig. 1.

Oil within the filter material 21 escaping laterally from the influence of high velocity air streams will tend to gravitate downward into regions in the filter material near the outer walls of each filter compartment. Since each filter compartment is substantially larger than the circular opening leading into the bottom of the compartment, it is apparent that temporary oil storage is provided by regions in the bottom of the filter compartment farthest removed from the bottom opening 30. The locations of such regions as provided by a non-circular compartment are indicated by the numeral 59 in Fig. 2.

While the pressure of the upwardly streaming air tends to hold oil in the temporary storage regions, nevertheless, oil continuously reaches the inclined bottom 29 of each compartment at the opening 30 and trickles down the interior of the cylinder 37 to join other quantities of oil that have been thrown against the cylinder by the swirling air. The downwardly moving oil reaching the disc 43 tends to flow spirally around the disc under the influence of the vortex, but such spiral flow is cut off by the radial apertures 45 and the oil drops down into the oil body below, such movement being assisted by the air streams passing downward through the apertures 45. Since the incoming air stream tends to throw dust particles against the disc 43 and the vortex tends to throw dust against the inner periphery of the cylinder 37, it is apparent that the major part of the dust carried by the incoming air stream will be immediately entrapped by oil flowing down the inner surface of the cylinder 37 and oil flowing over the upper surface of the disc 43. This dust-laden oil moves directly into the bottom of the cup where deposits of the entrained dust are gradually built up.

When operation ceases, oil rapidly returns to the idle level, and the return movement of the oil adequately flushes out the filter unit. When the dust deposits in the bottom of the cup approach the capacity of the oil body, the air cleaner may be serviced by merely removing the cups and changing the oil. Such servicing may be accomplished in a rapid and convenient manner without the necessity of removing the air cleaner as a whole.

I have found that the relatively coarse filter elements 34 are especially useful when the device is employed in an atmosphere containing chaff and similar light material, because such particles do not clog a relatively coarse filter material as readily as a relatively fine mesh material such as the filter medium 21. Since the elements 34 are readily removable and quite inexpensive, I contemplate providing a reserve of such pads with each air cleaner to permit the operator to replace a pad without taking time for a cleaning operation.

The air cleaner shown in Figs. 8 and 9 includes a dome-shaped filter unit 63 having a casing 64 supported by a central pipe 65 in much the same manner as before described, the pipe terminating in a flared end 66 interior of the filter unit and spaced below the top thereof. The filter unit is divided into four filter compartments 68 by four radially disposed partitions 69 extending outward from the pipe 65. The filter material 70, with which each compartment is filled, is held down from above by a suitable screen 71, the screen passing under the flared end 66 of the pipe 65 and being joined at its outer edges 72 to the interior of the casing 64. The filter unit has a downwardly extending peripheral skirt 73, and each filter compartment 68 has a bottom inclined to drain through a circular opening 74 surrounded by a downwardly disposed flange 75. Each of the openings 74 is spanned by a removable filter element 34.

For full-capacity operation, each compartment of the filter unit 63 is provided with an oil cup 23 and associated internal structure as previously described, each cup being removably held in place by a yielding finger 52a revolvably mounted on the pipe 65 by means that will be recognized from the previous description.

If full-capacity of the filter shown in Fig. 8 is not required, one or more of the oil cups 23 may be replaced by a sealing cup 76 that is adapted to embrace a flange 75 to serve as a closure for cutting off the associated filter compartment 68. It will be readily understood that for a given rate of air consumption the velocity of the air stream through each active oil cup 23 and its associated filter compartment 68 will vary inversely as to the number of oil cups in operation. By providing with each air cleaner of the two types described, sealing cups to be substituted for oil cups, I offer a simple means of adjusting the filter to the requirements of a range of operative conditions. By virtue of such adjustability, only one model will be required for widely different installations, and when the demand made on a given filter changes, the filter may be readily adjusted to meet the new demand efficiently. For example, if an engine is changed from heavy duty to light duty for an extended period of time, one or more oil cups of the associated air filter may be replaced by sealing cups to maintain optimum air velocity in the remaining oil cups.

A further feature of the air cleaner with respect to the multiple-oil cups is that the air cleaner may be serviced without interrupting its operation or lowering its efficiency during the servicing period. As soon as a sealing cup 76 effectively cuts off a filter compartment 68, oil in the associated filter medium will flow downward into the sealing cup, the downward flow washing out dust entrapped in the filter medium. After the oil has drained adequately from the filter compartment, a freshly filled oil cup may be substituted for the sealing cup containing the drained oil. If only three or less of the four oil cups are required for normal operation, the servicing procedure described will not reduce the operative efficiency of the air cleaner to any substantial extent.

I have discovered that the efficiency of the vortex in the cleaner tends to drop with increase of cross-sectional area of the air stream between the oil body and the filter medium. A feature of my multiple-cup air cleaner is that by dividing the air stream into a plurality of vortices flowing into the filter medium, I attain a higher efficiency of separation for a given total volume of air flow than may be attained by directing the total air flow into the filter medium over the oil body and into the filter medium as one stream.

A further important aspect of my multiple-cup feature is that there is less tendency for liquid to spill from open-top containers of small diameter than from containers of larger diameter of the same depth. This aspect is of especial importance in air cleaners mounted on tractors for operation over uneven ground.

Among the important factors determining the efficiency of my device are the velocity of the air passing through a filter compartment and the ratio between the volume of the filter medium in a filter compartment and the volume of oil available to permeate that medium. The level of the oil supported in the filter medium by the air streams passing upward therethrough tends to vary with the velocity of the air stream. By providing a sufficient number of filter compartments in a horizontally disposed filter unit, I am able to filter at a relatively high rate of air consumption without incurring air velocities in the filter medium sufficient to carry oil into the air passing from the air cleaner; also by virtue of the horizontal disposition of the filter unit, I am enabled to extend the lateral dimensions of the filter compartment sufficiently to provide any required ratio between the volume of the filter mass and the volume of oil available for movement into that mass, thereby avoiding such over-saturation of the filter material as would result in overflow of oil into the air passage leading from the air cleaner. By disposing my filter unit horizontally without sacrificing the efficiency characteristic of vertically disposed filter units, I am enabled to install a high-capacity cleaning unit in the limited vertical space under the hood of a car or tractor.

The air cleaner shown in Figs. 10 and 11 will be recognized as similar to those already described, the only essential difference being that this particular air cleaner has only one filter compartment and one oil cup. The filter unit 80 comprises a casing 81 containing a filter medium 82 and is supported by a vertical pipe 83 that extends upward through the bottom of the casing adjacent the peripheral wall 81a thereof to terminate at a level spaced below the top of the casing. A suitable coarse-mesh screen 84 serves as means to space the filter medium from the top of the pipe 83.

The bottom 85 of the filter unit 80 drains into an opening surrounded by the usual downwardly extending flange 87, the usual filter element 34 being seated inside the flange, and the usual cylinder 37 frictionally embracing the exterior of the flange. The remaining structure associated with the oil cup 23 will be recognized as identical with corresponding structures previously described, corresponding identifying numerals being employed. The oil cup is protected, as before, by the overhanging filter unit 80, additional protection being provided by a skirt 88 depending from the filter unit. The oil cup 23 is normally held in place by a yielding finger 52b extending from a ring 89 mounted on the pipe 83 between two flanged collars 90. It will be noted that in servicing the device it is necessary only to remove the oil cup.

In some installations where restriction of headroom is not a consideration, it is desirable to have the air intake of the air cleaner draw from a level substantially above the air cleaner. It is not unusual to extend the air intake pipe of an air cleaner on a tractor a considerable distance vertically into the air to tap a region of relatively low dust concentration. In the usual type of air cleaner, such an upward extension of the air intake may not be readily achieved. Having in mind this consideration, I have incorporated the principles of my invention in a down-draft air cleaner shown in Figs. 12 and 13 that may conveniently be installed on a tractor and provided with an upwardly extending intake.

A filter unit 93 is constructed with a vertically disposed cylindrical casing 94 hung from a radially disposed discharge pipe 95, which pipe may be in turn supported, for example, by the carburetor of an engine. The pipe 95 extends from the casing 94 near the top thereof and is provided at its inner end with a spoon-shaped extension 96. A suitable coarse screen 97 passing under the edges of the pipe extension 96 serves to restrain suitably the filter medium 98 in the casing.

The bottom 99 of the filter unit drains into a suitable opening defined by the usual downwardly extending flange 100, which flange receives a filter element 34, as previously described. Frictionally embracing the outside of the flange 100 is a deflector unit comprising the usual upper collar 101, radially disposed deflector blades 102, and lower circular band 103, which band carries a disc 43 previously described.

Normally the band 103 is engaged by an inwardly extending bead 104 formed in the wall of an oil cup 105, the oil cup embracing the lower end of the casing 93 and abutting a bead 106 therein. The oil cup 105 is provided with a hooked rim 107, which is normally engaged by a pair of manually releasable latches 108. Each latch 108, as shown in the drawings, is pivoted on a pin 109 in a suitable V-shaped bracket 110 and is normally held closed by a suitable spring 111, the spring being secured both to the pivot pin 109 and to a second pin 112 across the latch. It will be understood, of course, that any suitable means for removably retaining the oil cup may be employed.

An annular intake passage 113 is supplied by an intake pipe 114 that extends downward through the filter unit 93 from any desired distance above the filter unit. Preferably, the lower end of the intake pipe 114 is flattened as indicated at 115 and formed into an arcuate configuration conforming with a sector of the annular passage 113.

The specific embodiments of my invention set forth herein for the purposes of disclosure and illustration may be widely changed and modified without departing from the spirit of my invention. I therefore reserve the right to all such changes and modifications that properly come within the scope of my appended claims.

I claim as my invention:

1. An air cleaner of the class described, having in combination: a filter unit; a discharge passage leading from said filter unit; a plurality of intake ports in the filter unit; and a plurality of oil cups removably associated with said ports, whereby the oil supply of the air cleaner may be replaced in stages by servicing said oil cups consecutively without interrupting the service of the air cleaner as a whole.

2. An air cleaner of the class described, having in combination: a horizontally disposed filter unit; a discharge passage from the unit, said passage extending from the interior of the unit near the top thereof centrally downward through the bottom of the filter unit; a plurality of intake ports in the bottom of the filter unit; and a plurality of oil cups removably connected with said ports, whereby the air cleaner may be serviced progressively by removing some of said cups without interrupting operation of the air cleaner as a whole.

3. An air cleaner of the class described, having in combination: a horizontally disposed filter unit; passage means for drawing air from the unit; a plurality of intake ports in the bottom of the filter unit; and a plurality of oil cups removably connected with said ports, said filter unit being divided by walls into separate portions each having one of said intake ports.

4. An air cleaner of the class described, having in combination: a casing adapted to contain a liquid; an intake passage in the casing adapted to deliver air tangentially against the liquid to cause the liquid to rotate and to create a vortex above the liquid; a barrier plate in the casing positioned to extend across the liquid at least partially below the idle level of the liquid, said plate extending under said intake passage to shut off said intake passage from the space below the plate, said plate having at least one aperture disposed to favor diversion of the rotating liquid from above the plate to below the plate, and having another aperture for passage of the liquid upwardly through the plate into said vortex; a discharge passage leading from the casing; and a filter unit in the casing intermediate said passages.

5. An air cleaner of the class described, having in combination: a container for liquid; walls forming a circular passage upwardly from the liquid in the container; a chamber for filter material positioned at the upper end of said passage, said chamber being substantially larger in cross-sectional area than said passage, the bottom of said chamber sloping downwardly for drainage of liquid to the inner peripheral surfaces of said circular passage whereby the bottom of said chamber provides an annular relatively quiet zone around the upper end of said circular passage for the temporary storage of oil during high velocity flow through said passage; an annular intake passage into said container, said intake passage surrounding said circular passage; and an annular series of deflectors disposed to impart rotary motion to the air passing from said intake passage into said circular passage whereby dust carried by said air will be centrifugally thrown against the inner peripheral wall of said circular passage to be washed downwardly therefrom by drainage of oil from said chamber.

6. An air cleaner of the class described, having in combination: a filter unit; a discharge passage leading from said filter unit; a plurality of intake ports in the filter unit; a plurality of oil cups adapted to be connected with said ports; and closure means to cut off said ports selectively, whereby said oil cups may be temporarily removed, serviced and replaced consecutively without interrupting the operation of the air cleaner.

7. An air cleaner of the class described, having in combination: a filter unit; a discharge passage leading from said filter unit; a plurality of intake ports in the filter unit; one or more liquid cups removably connected to one or more of said ports in an operative manner permitting air passage therethrough; and one or more closure cups removably connected to one or more of said ports, said liquid cups and closure cups being interchangeable whereby a closure cup may be substituted for a liquid cup to cut off air flow through a port to permit liquid to drain into the closure cup, and whereby a liquid cup with a new supply of liquid may be subsequently substituted for the closure cup, the various substitutions being made without affecting the operation of the air cleaner.

8. An air cleaner of the class described, having in combination: a filter unit; a discharge passage leading from said filter unit; a plurality of intake ports in the filter unit; a plurality of liquid cups adapted to be connected with said ports; and one or more sealing cups adapted to be selectively substituted for said liquid cups to close said intake ports temporarily for drainage of liquid therefrom whereby said air cleaner may be progressively serviced without interrupting the operation of the cleaner as a whole.

9. An air cleaner of the class described, having in combination: a casing having a lower portion adapted to contain a liquid; a filter medium in the casing above said lower portion; walls forming a passage from said lower portion to the filter medium; walls forming an annular intake passage directed downwardly into said casing; a disc in the lower portion of the casing in the path of said annular intake passage disposed to receive liquid gravitating from said first-mentioned passage; and an annular series of deflector means associated with said annular intake passage whereby air from the annular intake passage is delivered downwardly against said disc in a rotary manner thereby moving the liquid thereon in a spiral stream, said disc having at least one opening to divert said spiral stream downwardly through the disc and having a central opening to permit oil to be drawn upwardly through the disc by the rotating air stream above the disc.

HERMAN H. GARNER.